(12) United States Patent
Sanghavi et al.

(10) Patent No.: US 10,284,618 B2
(45) Date of Patent: May 7, 2019

(54) DYNAMIC MEDIA CONTENT

(71) Applicant: Apple Inc., Cupertino, CA (US)

(72) Inventors: Mehul K. Sanghavi, Sunnyvale, CA (US); Michael Froimowitz Greenzeiger, Sunnyvale, CA (US); Steven C. Bredenberg, Campbell, CA (US)

(73) Assignee: Apple Inc., Cupertino, CA (US)

( * ) Notice: Subject to any disclaimer, the term of this patent is extended or adjusted under 35 U.S.C. 154(b) by 446 days.

(21) Appl. No.: 14/698,360

(22) Filed: Apr. 28, 2015

(65) Prior Publication Data

US 2016/0323343 A1    Nov. 3, 2016

(51) Int. Cl.
*H04L 29/06* (2006.01)

(52) U.S. Cl.
CPC ........ *H04L 65/602* (2013.01); *H04L 65/4076* (2013.01)

(58) Field of Classification Search
CPC .......................... H04L 65/602; H04L 65/4076
See application file for complete search history.

(56) References Cited

U.S. PATENT DOCUMENTS

| | | | | |
|---|---|---|---|---|
| 6,223,210 B1* | 4/2001 | Hickey | ................. | H04H 60/06 709/203 |
| 7,451,177 B1* | 11/2008 | Johnson | ............. | H04N 21/4825 455/3.01 |
| 8,006,261 B1* | 8/2011 | Haberman | ........... | G11B 27/031 725/32 |
| 8,630,899 B1 | 1/2014 | Barbulescu et al. | | |
| 9,270,718 B2* | 2/2016 | Emerson, III | .......... | H04L 67/10 |
| 2010/0043022 A1* | 2/2010 | Kaftan | .................. | G06Q 30/02 725/34 |
| 2012/0060185 A1* | 3/2012 | Rakesh | .................. | G06Q 30/02 725/36 |
| 2013/0198012 A1 | 8/2013 | Stimmel et al. | | |
| 2014/0040039 A1* | 2/2014 | Gates, III | ........... | G06Q 30/0269 705/14.66 |
| 2014/0040945 A1 | 2/2014 | Gates, III et al. | | |
| 2014/0149596 A1* | 5/2014 | Emerson, III | .......... | H04L 67/10 709/231 |
| 2015/0006299 A1 | 1/2015 | Efrati et al. | | |
| 2015/0256581 A1* | 9/2015 | Kolhi | .................... | H04L 65/602 709/219 |

FOREIGN PATENT DOCUMENTS

WO    WO 2011/067785    6/2011

* cited by examiner

*Primary Examiner* — Wing F Chan
*Assistant Examiner* — Billy H Ng
(74) *Attorney, Agent, or Firm* — Polsinelli PC (57) ABSTRACT

Systems, methods, and computer-readable storage media for dynamic radio content. The system generates a media item to be inserted into a media stream. The media item can include multiple segments associated with a set of discrete components. Next, the system inserts the media item into the media stream. In response to a triggering event, the system then re-generates the media item by assembling the multiple segments using a new set of the discrete components. The system then inserts the re-generated media item into the media stream.

21 Claims, 5 Drawing Sheets

DYNAMIC MEDIA CONTENT

TECHNICAL FIELD

The present technology pertains to media content, and more specifically pertains to generating dynamic media content for inserting into media feeds.

BACKGROUND

Oftentimes, media content providers, including radio broadcasters, insert media content into live media feeds in order to diversify the content in the media feed and enrich the listener's experience. However, the content inserted into a live media feed is static and does not vary. As a result, the same, static media content item is repeatedly provided in the media feed at specific intervals. Accordingly, listeners will end-up hearing the same, static media content item over and over. Listeners are then less impacted by the media content item and, in fact, often "tune out" the message. Thus, the lack of novelty of the media items inserted into live media feeds diminish the impact of the message or content and can negatively impact the listener's experience. Yet current solutions do not allow diversity in the media content inserted into a media stream.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be implemented for generating dynamic radio content. In particular, a particular media content item for a radio stream can be constructed by assembling multiple, discrete media components. Each of the discrete media components can be selected from a group of varying media components. This way, different versions of the media content item can be constructed by varying the media components selected when assembling the multiple, discrete media components.

Disclosed are systems, methods, and non-transitory computer-readable storage media for dynamic radio content. The system generates a media item to be inserted into a media stream. The media item can include multiple segments associated with a set of discrete components. Next, the system inserts the media item into the media stream. In response to a triggering event, the system then re-generates the media item by assembling the multiple segments using a new set of the discrete components. The system then inserts the re-generated media item into the media stream.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for dynamic content in media feeds. Disclosed are systems, methods, and non-transitory computer-readable storage media for dynamic construction of content in media feeds. A brief overview of generating dynamic media content is first provided herein. An introductory description of an example configuration of devices and a network is then disclosed herein. A detailed description of dynamic media content and exemplary variations will then follow. These variations shall be described herein as the various embodiments are set forth. The disclosure now turns to the overview of generating dynamic media content.

As previously indicated, when a user is provided the same identical media content multiple times, the repetition of the same content can negatively affect the impact to the listener. To this end, the approaches set forth herein allow for dynamic variation of media content, including radio content, to limit the repetition of content within content packages. Accordingly, in some cases, each content package can be constructed using several components which can be assembled into segments that form portions of the content package.

The content package can be any media content package, such radio content (e.g., video, audio, or any combination of media content). In some embodiments, the media content package can be a content package for a radio stream, or a radio content package. Specific components used in constructing a radio or any other media content package can include different types of media content, such as text, video, audio, banners, bumper content, advertising content, music, background sound, images, etc. For example, the radio content package can be constructed from one or more vocal or audio track segments, background music or sounds, banner assets, and bumper content (e.g., content for introductions, transitions, or conclusions).

Moreover, the vocal or audio track segments can be created using one or more voices, personalities, programs, sounds, or systems. For example, voice or vocal tracks can be generated using one or more voice recognition programs, such as Siri® by APPLE, INC. Thus, the voice or vocal tracks can include various implementations, including different voice recognition software implementations, and may include different content and/or voices. For example, two vocal tracks can include varying vocal content, such as different announcements; different voices, such as female or male voices; or a combination of different vocal content and different voices.

In some cases, vocal track segments can contain discrete messaging such that they can be combined in an arbitrary order and still provide a coherent overall experience. Moreover, vocal track segments can be prerecorded or can be produced by speech synthesis, using a speech software such as Siri®, based on a copy of the vocal track, which can be provided, for example, by a content provider or advertiser. In some cases where vocal track segments are produced by speech software, each vocal track can be potentially delivered in one or more voices (e.g., male, female, child, adult, etc.).

Bumper content can occur before or after the content package itself. The bumper content can include radio stingers, such as iTunes® radio stingers; musical interludes; news or weather updates; etc. Bumper content can serve to signal the user that there is a break between the radio content and the content package (e.g., media item, advertisement, etc.), or attract the user's attention in preparation for the content package (e.g., media item, advertisement, etc.). For example, bumper parameterizing may include—(1) weather snippet, (2) social call-outs ("Your Facebook Friend Michael Says Happy Birthday"), (3) Calendar Appointments, (4) social media messages, etc.

In some embodiments, each version of the content package can be presented or played a specific number of times, such as 5-10 times, to allow the content package to have an impact on the user without creating too much repetition and detrimental results. The number of repetition can be finetuned to increase the impact on an individual. To this end, repetition sequences can be tested, scored, and compared to identify an optimal repetition number, which can be specific to a segment of users or individual to a user.

In some cases, each iteration of the algorithm for constructing the content package can select an ordering, which can be random, of the vocal track segments, a background music variant and a banner asset variant. A sound check can be used to adjust a level of voice-over to match with background music or audio. The composite package unit version from that variant can be repeated x times (e.g., 5-10 times) for the same listener or group of listeners when requested for a radio or feed slot. Once the variant has finished repeating for a listener, a new variant can be selected. In some cases, the new variant may not use any of the same elements as the previous variant except for the vocal track segments which may merely be in a different order than the previous variant.

The embodiments above can maximize the total number of unique creatives that can be delivered to the same user. The notion of a unique creative in this context may assume that at least one of the parameterized sections is unique out of all the combinations that are delivered to the user. While the number of unique creatives can be maximized, in some cases, the unique creatives may be optimized from within a limit set based on user affinity towards certain n types of parameterized content packages. For optimization of these creatives, additional embodiments can be considered.

With parameterizing creative-level optimization can become more complex for a traditional content server. Thus, features such as creative weighting/3rd party pixel tracking can be hard to meet if the parameterized creatives are seen as a single block (webarchive). To this end, a creative can be a sum of all the parameterized parts. Thus if a creative= (Personalized Content A)+(Bumper X)+(Middle Content Y)+(Post Content Z)+(Personalized Content B), then each of the sections can be individually weighted by the content server. Accordingly, the content server can elevate (Middle Content Y) more often as compared to the other pieces in the parameterized creative. Moreover, the content server can analyze, optimize, or manipulate specific sections of the content package to allow for greater granularity and flexibility.

Another embodiment for optimization consideration is handling of creative property manifest files. Each creative 'web archive' can contain points to separate pieces that are downloaded beforehand or in real-time. If the user has shown a higher response rate to content which contain a specific parameter in a section of the creative, then the content server can send down more of such parameterized content down to the user's device.

Additional embodiments to consider include: a user interface system for building a highly dynamic audio content package from pre-recorded clips. This can be created with a stock of audio clips, which can be used to run speech-to-text software against it, to allow the user to make selections for dynamic swap-outs. Those swaps outs can be driven by a rules system. After setting a relevant rule, the user interface can allow a clip to be uploaded or a recording to be made directly.

Some embodiments may include telescoping audio offers. The majority of the content here can be stock, but the offer and location can be dynamically calculated based on the user. Other embodiments, can allow for user interactions with the audio content. Still other embodiments can allow for specific swappable variables within an interactive audio package.

Figure 1:
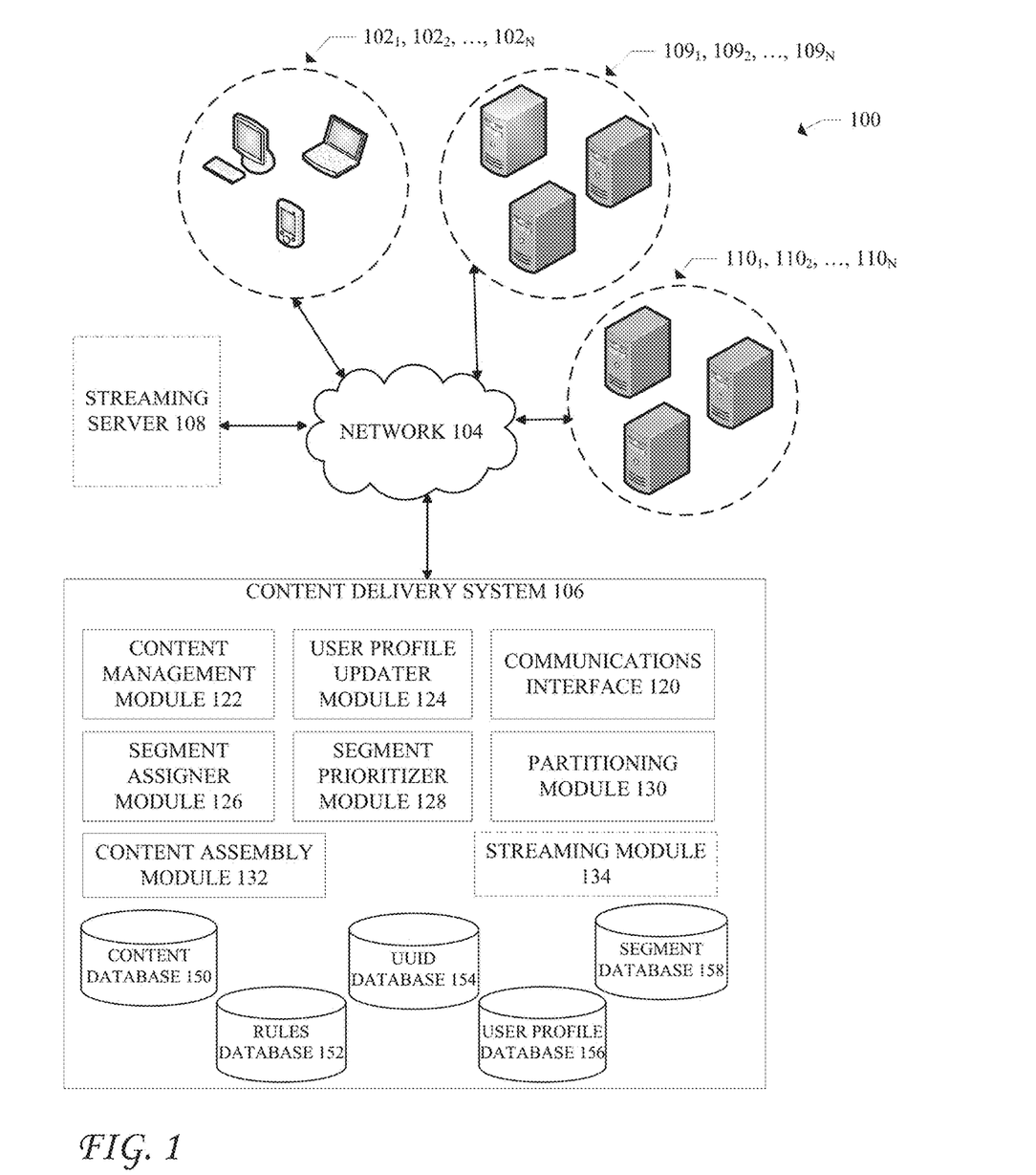
FIG. 1 illustrates an example configuration of devices and a network.

The disclosure now turns to FIG. 1. An example system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, media content, including radio content and feeds, can be delivered to user terminals $102_1$, $102_2$, . . . , $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, an advertisement, a video, a radio feed, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1, 109_2, \ldots, 109_n$ (collectively "109") and/or content from one or more secondary content providers $110_1, 110_2, \ldots 110_n$ (collectively "110") to generate the assembled content package for the user terminals 102. For example, in the case of a radio feed being delivered to a requesting one of user terminals 102, the content management module 122 can assemble a content package by requesting the data for the radio feed, including any additional media content that may be inserted into the radio feed, from one of the primary content providers 109. For the media content for the radio feed provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include radio or media content, such as text, graphics, audio, video, executable code, or any combination thereof. Further, an assembled content package can include media content designed to inform or elicit a pre-defined response from a user. In some embodiments, the media content can be associated with a product or can directly or indirectly advertise a product. For example, the assembled content package can include one or more types of advertisements from one or more advertisers.

Additionally, the media content can be active media content. That is, media content that is designed to primarily elicit a pre-defined response from a user. For example, active media content can include one or more types of advertisements configured to be clicked upon, solicit information, or be converted by the user into a further action, such as a purchase or a download of the advertised item. However, media content can also be passive media content. That is media content that is designed to primarily inform the user, such as a video. In some cases, passive media content can include information that can lead or direct users to other media content including active media content.

Furthermore, the media content, which can include radio content or feeds, can be dynamic media content. That is media content that varies over time or that varies based on user interaction. For example, dynamic media content can include an interactive game. However, the various embodiments are not limited in this regard and the media content can include static media content that neither varies over time nor with user interaction. In the various embodiments, media content in a content package can be static or dynamic and active or passive. A content package can include a combination of various types of media content in a single content package.

In some cases, a content package can replace or update media content in a content package already delivered to a user terminal. For example, a first content package can include an app that can be installed on the user terminal $102_i$. A subsequent content package can include one or more items of media content that can be presented to a user of the user terminal 102, while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

In some cases, the content stored by the content database 150 can include various components or segments for generating media content to be inserted into a radio feed. For example, the content database 150 can include one or more vocal track segments, background music or audio, banner assets, bumper content, sound segments, audio or vocal variations, etc. The components or segments can be used by content assembly module 132 to generate a content package or media item for a media feed, such as a radio stream. The content package can include multiple components, such as a vocal track component, a background music or audio component, a banner asset, and a bumper content component. The content assembly module 132 can retrieve each of the components from the content database 150 to generate the content package. The content database 150 can include multiple versions of one or more specific components, so the content assembly module 132 can vary the content package when assembled multiple times by using a different version of a specific component to construct the content package. For example, the content assembly module 132 can construct a first version of the content package by using a vocal track component, a background music component, a banner asset, and a bumper content component. The content assembly module 132 can subsequently construct a modified version of the content package by using a different version of the vocal track component, the background music component, the banner asset, and/or the bumper content, from the content database 150, for example. The content assembly module 132 can then construct another modified version by once again using a different version of one or more of the components in the content package, selected from the content database 150, to construct the content package. This way, the content assembly module 132 can dynamically vary the content package by using different versions of specific components in the content package from the content database 150 when constructing the content package to add novelty or variation to the content package.

The content assembly module 132 can vary the content package every time it constructs the package, every n number of times it constructs the content package, or any other randomly or manually determined number of times. In other cases, the content assembly module 132 can vary or modify the content package every predetermined number of times the content package is used, presented, transmitted, or requested. For example, the content assembly module 132 can modify or vary the content package every $7^{th}$ time the content delivery system 106 inserts the content package into a radio feed. Thus, the radio feed can provide the content package within the radio feed and vary specific components within the content package every $7^{th}$ instance. In yet other cases, the content assembly module 132 can vary the content package on a schedule or on predetermined time intervals. For example, the content assembly module 132 can vary the content package every 10 minutes. After 60 minutes of having constructed, presented, or transmitted a content package, the content assembly module 132 can also construct a new version of the content package to be used any time in the next 60 minutes.

Streaming module 134 can generate a media stream or feed for streaming content to devices 102. In generating the stream or feed, the streaming module 134 may obtain content from the content database 150 or any other database, to prepare the content for streaming. Streaming module 134 can also format or condition the stream for transmission to devices 102. Once the streaming module 134 has generated the stream, it can stream the media content to the devices 102. For example, streaming module 134 can stream radio content, video content, or any other type of media content to devices 102.

In some cases, streaming module 134 can schedule and select specific media content to be streamed to devices 102 at specific times. Moreover, streaming module 134 can create content slots within a media feed for inserting content into the feed, such as a media content package, a video, or an advertisement. For example, streaming module 134 can create media slots for inserting the content packages created by the content assembly module 132 into the feed transmitted to the devices 102. Thus, the streaming module 134 can stream a media feed to devices 102, and insert one or more media content packages generated by the content assembly module 132, within the media feed transmitted to devices 102. In some cases, streaming module 134 can trigger the content assembly module 132 to generate a content package for inserting into the stream and vice versa. For example, the streaming module 134 can send a request for a content package to the content assembly module 132, which can trigger the content assembly module 132 to generate or modify a content package for the stream. On the other hand, the content assembly module 132 can otherwise request to the streaming module 134 that it insert a content package into the media stream.

In some configurations, the content delivery system 106 can stream media content using the streaming module 134 as previously explained. However, in other configurations, the media stream may be generated or transmitted to devices 102 by a separate streaming server 108, which can be, for example, a radio server or a media streaming server. Here, the content delivery system 106 can generate content packages using the content assembly module 132 and transmit the content packages to a streaming server 108 which can stream content, such as radio content, to the devices 102. The streaming server 108 can thus receive the content packages from the content delivery system 106 and insert the content packages into a media stream before it sends the media stream to the devices 102. Moreover, the streaming server 108 can include one or more servers and storage devices. For example, the streaming server 108 can be a cluster of servers for streaming content. The cluster of servers can load balance streaming and requests, for example, for better performance. The streaming server 108 can communicate with the content delivery system 106 and/or devices 102 through network 104. In some cases, the streaming server 108 and content delivery system 106 can reside on a same physical or virtual network. In other cases, the streaming server 108 and content delivery system 106 can reside on separate or remote physical networks or logical segments.

Content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including media content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, media content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of media content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc.

of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting media content to target to users. The segment database 158 can store defined segments and associations between the segments and users and/or media content that should be targeted to users associated with the segments. As described above, a targeted segment can be defined based on one or more user characteristics or derivatives thereof and can be associated with one or more items of media content. Additionally, a targeted segment can be associated with one or more users. In some embodiments, by associating a targeted segment with both a user and an item of media content, the delivery system can match media content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can also include a sessions database 160. The sessions database 160 can store session information collected for one or more user sessions. For example, the sessions database 160 can store sessions of content presented at user terminals 102. In some cases, the sessions database 160 can store time spent information for sessions of content. For example, the sessions database 160 can store a record for each session of content at the user terminals 102, and the time spent measured for each of the sessions. The time spent can include the length of a session, the amount of time spent by the user engaged in the content presented in a session, the amount of active engagement in the session, the amount of passive engagement in the session, the absolute length of time of a session, etc. Such time spent information can be stored in the sessions database 160. Other time spent information, such as average time spent for one or more sessions or adjusted time spent for one or more sessions, can also be stored in the sessions database 160.

The sessions database 160 can store any number of sessions used or selected as input by the user journey processing module 132, as further described below, or any other module, component, and/or device. Moreover, the sessions in the sessions database 160 can be stored in specific groupings, segments, categories, clusters, and/or partitions, based on one or more factors and characteristics, as further described herein. In some configurations, groups or clusters of sessions and corresponding session information, such as time spent information, can be stored in the sessions database 160 according to session clusters, segments, or groupings used by the user journey processing module 132 to process or generate user journey information. Further, the sessions database 160 can also store session events and related information, such as user activity and inputs, as well as user journeys.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 156 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

In some embodiments, the content delivery system 106 can include a partitioning module 130. The partitioning module 130 can perform partitioning tasks based on the configuration of the content delivery system 106. In some configurations, the partitioning module 130 can divide content, such as a presentation of content, or a user session into partitions of time. In other configurations, the partitioning module 130 can divide sessions of content into partitions or subgroups. While FIG. 1 illustrates the partitioning module 130 as a component of the content delivery system 106, one of ordinary skill in the art will readily recognize that the partitioning module 130 can be separate from the content delivery system 106. For example, in some cases, the partitioning module 130 can be a component of content provider $109_i$, content provider $110_i$, user terminal $102_i$, or any other server or client device.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of media content, radio content, or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

To implement the various embodiments of the present technology, the content delivery system 106 can include additional components. For example, one aspect of the present technology can implement a standardized analysis module for radio events. In some cases an item of media content delivered to one or user devices 102 can include a JavaScript-based engine or module that is designed to listen or monitor for events at the device and thereafter cause messages to be transmitted back to the content management system 106. This engine or module can be hardcoded in the item. The present technology contemplates supplementing this module with an analysis module that can be updated over time. Thus, no updating of the media content item is required. Further, the present disclosure contemplates a standard reporting from such a module. Thus, the module can be added to any item of media content, regardless of its features.

Figure 2:
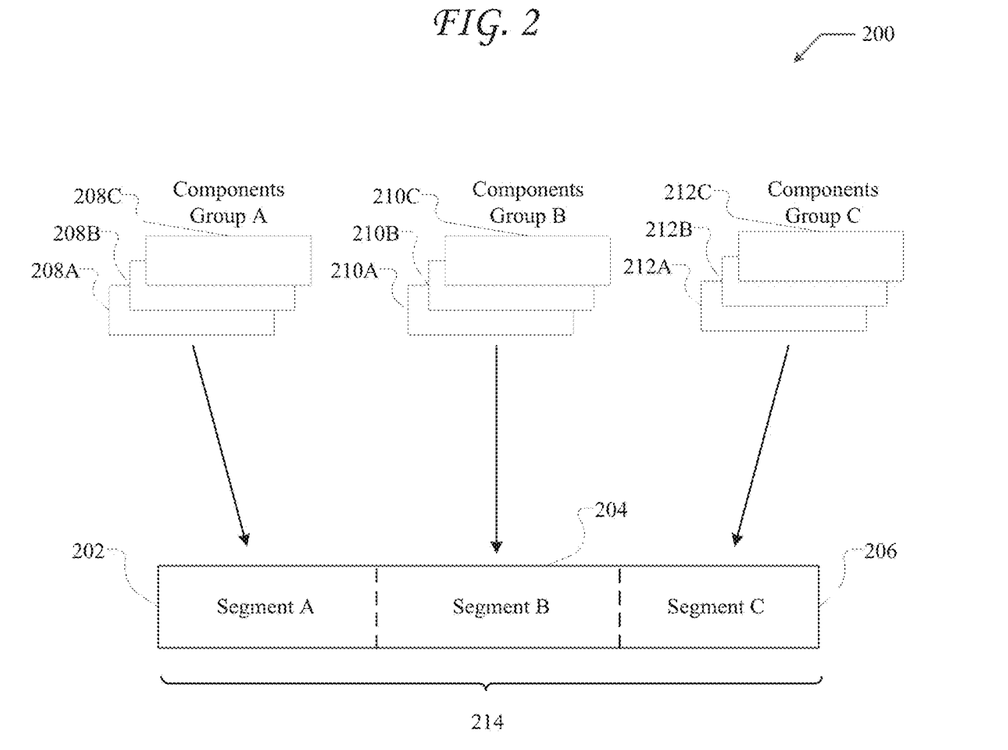
FIG. 2 illustrates an example component selection diagram for generating a media content package.

The disclosure now turns to FIG. 2, which illustrates an example component selection diagram 200 for generating a radio content package. In some cases, the radio content package can be generated by content delivery system 106, illustrated in FIG. 1, through the content assembly module 132, for example. Further, the media content package 214 can be constructed by assembling discrete components 208A-C, 210A-C, and 212A-C into segments 202-206. Each of the discrete components 208A-C, 210A-C, and 212A-C can make up a segment of the media content package 214. The discrete components 208A-C, 210A-C, and 212A-C can include any type or category of media content, such as vocal tracks, background music, banner assets, bumper items, etc. For example, components 208A-C can be vocal tracks, components 210A-C can be background music, and components 212A-C can be banner assets or bumper items. Thus, to generate the media content package 214, a vocal track from components 208A-C can be inserted into segment 202, a background music component from components 210A-C can be inserted into segment 204, and either a banner asset or bumper item from components 212A-C can be inserted into segment 206. Accordingly, each of the segments 202-206 can define a slot for a component from components 208A-C, 210A-C, and 212A-C. The combination of the vocal track, the background music, and the banner asset or bumper item inserted into segments 202-206 respectively can make up the entire media content package 214.

As previously explained, the content for each of the segments 202-206 can be selected from a respective group of components (208A-C, 210A-C, and 212A-C). For example, the content for segment 202 can be selected from components group A (208A-C), the content for segment 204 can be selected from components group B (210A-C), and the content for segment 206 can be selected from components group C (212A-C). Moreover, the components 208A-C, 210A-C, and 212A-C from the components groups A, B, and C, respectively, can be a specific type or category of components. For example, components group A (208A-C) can include vocal tracks, components group B (210A-C) can include background music, and components group C (212A-C) can include banner assets or bumper items. Each of the components in a group (i.e., each component in components group A, B, and C) can be different in some way. For example, each component in a group can have different attributes, characteristics, settings, content, organization, audio, length, etc. To illustrate, from group A, component 208A can be a vocal track with a female voice while component 208B can be the same vocal track but with a male voice, and component 208C can be a vocal track with a modified message, such as a different message content (e.g., "sale ends tomorrow" vs "sale ends today") or a different ordering of message content (e.g., "sale ends today" vs "today ends sale"). As another example, from group B, component 210A can be a specific background song, component 210B can be a remix of the same background song, and component 210C can be a different background song altogether.

The groups of components (group A 208A-C, group B 210A-C, and group C 212A-C) can include different versions of components to be used as content for segments 202-206, for assembling different versions of the media content package 214. For example, the media content package 214 can be first assembled using components 208A, 210A, and 212A for segments 202-206. The media content package 214 can subsequently be varied by re-assembling the media content package 214 using other components from the groups of components (group A 208A-C, group B 210A-C, and group C 212A-C). For example, a second version of the media content package 214 can be assembled using component 208A, component 210B, and component 212C. The media content package 214 can then be varied again by assembling a different version using, for example, component 208C, component 210A, and component 212B. Multiple other variations or versions of the media content package 214 can be dynamically assembled as necessary to maintain variation in the media content package 214 when presented to one or more users multiple times, and to maximize the attentiveness of the user or the impact of the media content package 214. For example, a version of the media content package 214 based on components 208A, 210A, and 212A can be inserted into a radio stream x number of times without change. Thereafter, a second version of the media content package 214 can be assembled based on components 208A, 210C, and 212B, and inserted into the radio stream for x number of times.

The media content package 214 can be inserted multiple times into a radio stream transmitted to one or more user devices. Thus, the radio stream can play radio content, followed by playback of the media content package 214. The radio content from the stream can then resume after playback of the media content package 214. The media content package 214 can subsequently be inserted into the radio stream throughout a playback period of the radio stream. In some cases, the media content package 214 can be inserted into the radio stream by content delivery system 106 using the content assembly module 132 and/or streaming module 134. In other cases, the media content package 214 can be received by streaming server 108 from content delivery system 106 and inserted by the streaming server 108 into a media stream, such as a radio feed, broadcast by the streaming server 108 to the devices 102. For example, the streaming server 108 can receive the media content package 214 from content delivery system 106 and insert the media content package 214 into the radio stream it broadcasts to devices 102. In other cases, the content delivery system 106 can both generate the media content package 214 using the content assembly module 132, insert the media content package 214 into a media stream or feed, and broadcast the media stream or feed with the media content package 214 to devices 102 using the streaming module 134. In some cases, the content delivery system 106 can generate the media content package 214 dynamically and insert it into the radio stream as it generates the media content package 214 or as a slot within the radio stream becomes available. The content delivery system 106 can then stream or broadcast the feed with the media content package 214 to devices 102, as previously explained.

The media content package 214 can be inserted into the radio stream within slots at specific intervals. Thus, media content slots can be created within the radio stream at specific intervals for inserting the media content package 214. In this way, a first interval can define the length of playback time of the radio stream between a first slot for the media content package 214 and a second slot for the media content package 214. The intervals can be regular or equal intervals, irregular or differing intervals, random intervals, scheduled or predefined intervals, intervals triggered by specific events, and so forth.

Moreover, the version of the media content package 214 inserted at each slot or group of slots within the radio stream can be the same or may be varied. For example, a first version of the media content package 214 can be provided at the first 5 slots in the radio stream, a second version of the media content package 214 can be inserted in the next 5 slots in the radio stream, and so forth. Further, in some embodiments, the different versions of the media content package 214 inserted into the radio stream can be dynamically assembled as necessary based on the groups A-C of components (208A-C, 210A-C, 212A-C). Further, the types and/or number of components in the media content package 214 can be varied or modified when assembling different versions of the media content package 214. For example, a first version of the media content package 214 can include a vocal track, a banner asset, and a background music asset. A second version of the media content package 214 can then be generated to include a first vocal track, a second vocal track, a bumper item, and a banner asset.

In addition, specific presentation parameters can be selected or modified when creating different versions of the media content package 214, in order to control and vary the presentation of the specific components in the media content package 214. The presentation parameters can include any parameters or settings associated with the presentation of one or more components in the media content package 214, such as, for example, parameters specifying the presentation duration of a specific component(s), presentation location of a specific component(s), presentation timing of a specific component(s), presentation sequence of one or more components, presentation trigger for a specific component(s), presentation relationships of one or more components, or any other setting defining how, when, or where one or more components are presented during a presentation of the media content package 214. For example, the media content package 214 can include parameters or configurations defining when and/or where specific components are to be presented during a presentation of the media content package 214.

Moreover, the presentation parameters for one or more components may or may not be relative to each other. For example, the presentation parameters, such as timing, of one or more components may be irrespective and/or independent of the presentation parameters of other components. Therefore, such one or more components may be presented at a specific time within the presentation of the media content package 214 that is irrespective and/or independent of other component(s). To illustrate, a banner asset or background music item may be presented throughout the entire, or nearly the entire, presentation of the media content package 214, without any specific relationship in time with other components. Thus, the other components may be presented without regard to whether the banner asset or background music item are being presented before, after, or during the presentation of the other components. Accordingly, the presentation parameters, such as timing, location, ordering, etc., of certain—or all—components in the media content package 214 may be unrelated to (i.e., have no relationship to) the presentation parameters of any other—or all—components.

However, in other cases, the presentation parameters of one or more components may be configured to be relative to the presentation parameters of one or more other components. For example, a bumper item may have presentation parameters specifying a timing of presentation of the bumper item that is relative to the presentation of one or more other components, such as a first vocal track and a second vocal track. To illustrate, the bumper item may have presentation parameters specifying that the bumper item is to be presented between the first and second vocal tracks in order to provide a transition between the first and second vocal tracks. Also, in yet other embodiments, one or more components of the media content package 214 may include presentation parameters that are relative to presentation parameters of one or more other components while also being irrespective and/or independent of the presentation parameters of still one or more other components.

While media content package 214 is illustrated in FIG. 2 as having segments 202-206, one of ordinary skill in the art will readily recognize that other implementations may include more or less segments. Moreover, the specific examples of types of components described here are non-limiting examples for the sake of clarity and explanation. Indeed, other types of components are also contemplated herein.

Figure 3:
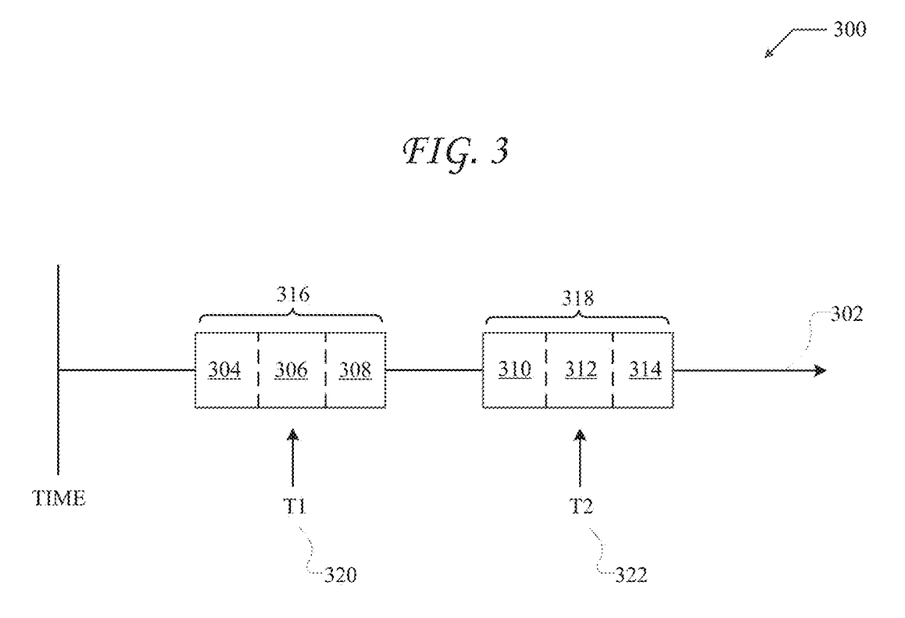
FIG. 3 illustrates an example configuration of a media stream with media content packages.

FIG. 3 illustrates an example configuration 300 of a radio stream 302 with media content packages 316 and 318. The radio stream 302 can be broadcast or transmitted by a streaming server. For example, the radio stream 302 can be transmitted to devices 102 by content delivery system 106 and/or streaming server 108. Further, the radio stream 302 can include any type of media content, such as audio, video, text, images, and so forth. Moreover, the radio stream 302 can include a stream or feed of radio content over time.

Media content packages 316 and 318 can be inserted into the radio stream 302 at specific time intervals 320-322. For example, media content package 316 can be inserted into interval 320 within the radio stream 302 for playback at T1, and media content package 318 can be inserted into interval 322 within radio stream 302 for playback at T2. Moreover, the media content packages 316 and 318 can be inserted within the radio stream 302 at specific slots, on a schedule, or dynamically at the moment that the media content packages 316 and 318 are generated. In other cases, the media content packages 316 and 318 can be inserted into the radio stream 302 at specific points, sections, or times within the radio stream 302 based on a content it is intended to replace. For example, if the radio stream 302 includes an advertisement at T1, the media content package 316 can be inserted into T1 in order to replace the advertisement.

As another example, the media content packages 316 and 318 can be inserted into the radio stream 302 at specific points or segments within the radio stream 302 identified by a user or a server. For example, the media content packages 316 and/or 318 can be inserted at a beginning of specific content within the radio stream 302, an end of specific content within the radio stream 302, a pause or gap of content within the radio stream 302, a filler section, or any other segment. In other cases, the media content packages 316 and 318 can be inserted to replace content within the radio stream 302 based on specific attributes. For example, the media content package 316 may be inserted at T1 if T1 is currently associated with extra, supplemental, or duplicate content. Thus, the media content package 316 can be used to replace or truncate a portion of the radio stream 302.

Media content packages 316 and 318 can include different versions of the same components. For example, media content package 316 can include segments 304-308 and media content package 318 can include segments 310-314. Segments 304-308 can be respectively mapped to the same type of components. For example, segments 304 and 310 can both be assigned to vocal tracks, segments 306 and 312 can both be assigned to background music, and segments 308 and 314 can both be assigned to bumper items. However, one or more of the components from media content packages 316 and 318 can be varied. For example, media content package 316 can include a different vocal track than media content package 318. This way, the media content packages provided within the radio stream 302 can be varied over time.

In other embodiments, the media content packages 316 and 318 can include different types of components. For example, at least one of segments 304-308 from media content package 316 can be assigned to a different type of component than segments 310-314 from media content package 318. To illustrate, segments 304-308 from media content package 316 may be correlated to a vocal track, background music, and a banner asset, while segments 310-314 from media content package 318 can be correlated to a vocal track, background music, and a bumper item. Thus, both media content packages will include at least one different type of component.

Media content packages 316 and 318 can also include different number of components. For example, media content package 318 can be varied to include more or less segments, and thus components, than media content package 316. In addition, the media content packages 316 and 318 can include a different ordering of segments and components.

While the stream 302 is described herein as a radio stream, one of ordinary skill in the art will readily recognize that other types of streams are also possible and contemplated herein. Indeed, the concepts described herein are applicable to other types of streams as well. Non-limiting examples of other types of streams can include video streams, audio streams, or any other type of media stream.

Figure 4:
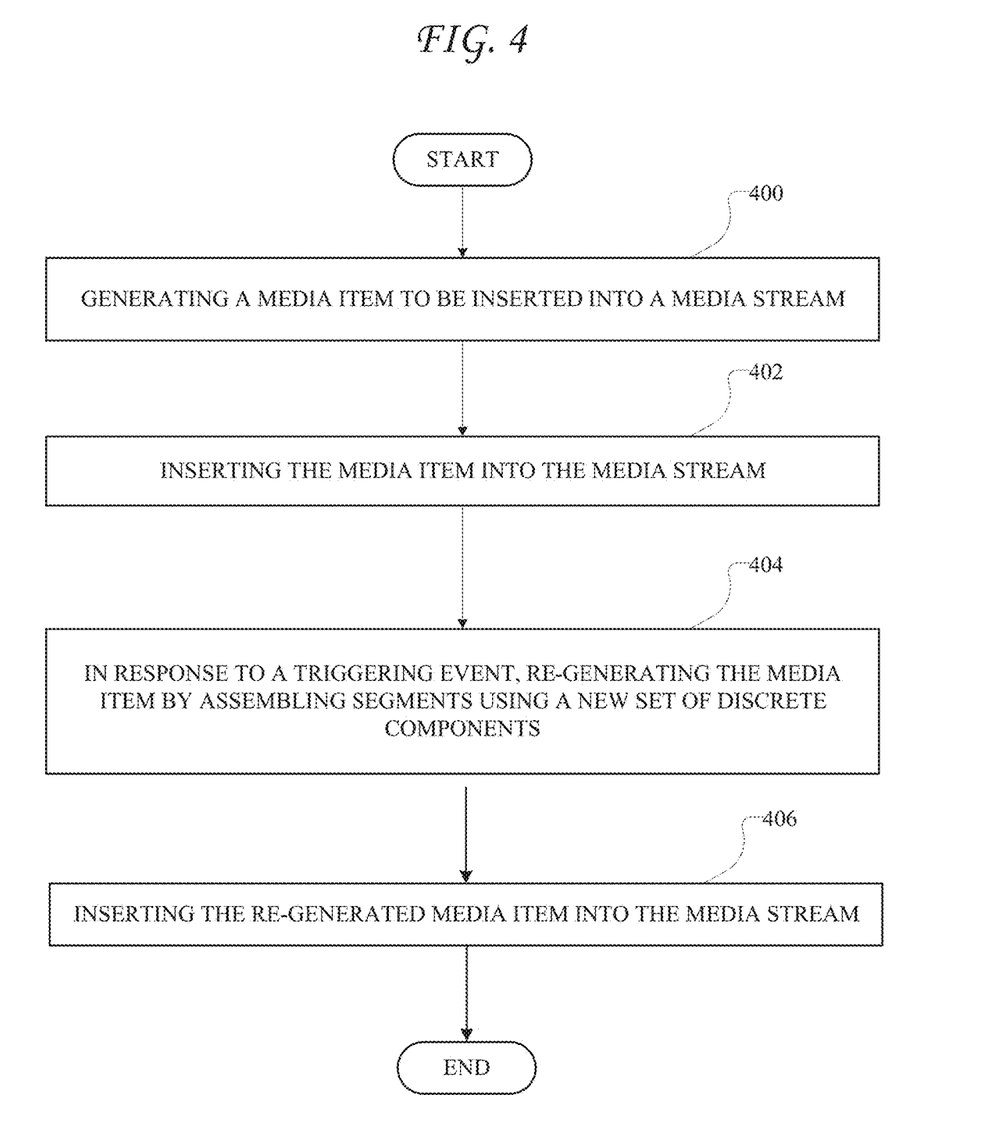
FIG. 4 illustrates an example method embodiment.

Having disclosed some basic system components and concepts, the disclosure now turns to the exemplary method embodiment shown in FIG. 4. For the sake of clarity, the method is described in terms of a content delivery system 106, as shown in FIG. 1, configured to practice the method. The steps outlined herein are exemplary and can be implemented in any combination thereof, including combinations that exclude, add, or modify certain steps.

The system 106 generates a media item to be inserted into a media stream (400). The media item can be a media content package, such as media content package 214 in FIG. 2. Moreover, the media item can include multiple segments associated with a set of discrete components. For example, each segment can include a component from the set of discrete components. Further, the media stream can be a radio stream. Here, the media item can be a media package to be inserted into the radio stream.

Next, the system 106 inserts the media item into the media stream (402). Thus, the media item can be provided as part of the media stream. In some cases, the media stream can transition to the media item and back to the media stream. The media item can be inserted into a specific slot within the media stream. In other cases, the media item can be inserted randomly into the media stream or inserted based on a preference or schedule.

In response to a triggering event, the system 106 then re-generates the media item by assembling the multiple segments using a new set of the discrete components (404). The triggering event can be, for example, a user request, an interval period, a predetermined number of times the media item has been inserted into the media stream, a number of times the media item has been transmitted or presented to a user or device, a time interval, a schedule event, etc. The media item can be re-generated by assigning specific components for each of the multiple segments. Moreover, in assigning specific components for each of the multiple segments, the system 106 can vary at least one of the discrete components previously used in the media item. For example, if one of the segments in the media item previously was a vocal track, the re-generated media item can be assembled by selecting a new vocal track to replace the previous vocal track for a specific segment. As another example, the media item can be re-generated by assembling the discrete components and adding a new discrete component or replacing a discrete component with a different discrete component.

Next, the system 106 inserts the re-generated media item into the media stream (406). The system 106 can insert the re-generated media item at a specific slot in the media stream. In some cases, the media slot can be based on an interval, such as a time or presentation interval. In some embodiments, the re-generated media item is inserted into the media stream after the previously-generated media item has been transmitted or presented within the media stream a predetermined number of times. For example, after the media item is transmitted or presented within the media stream 7 times to a device or group of devices, the media item can be re-generated and inserted into the media stream. The media stream can then be transmitted with the re-generated media item. The re-generated media item can then be transmitted or presented another predetermined number of times or for a number of time intervals, and subsequently re-generated again. Here, the media item can be once again modified and the modified version inserted into the media stream. The media item can be re-generated each time dynamically, in advance, or in real-time (or near real-time).

In some cases, the discrete components used to generate and re-generate the media item can include, for example, vocal tracks, background music, bumper items, banner assets, or any other media component. Moreover, each of these components can be selected, when generating the media item, from multiple components. For example, a vocal track can be selected from a group of different vocal tracks. The group of components can allow for variations of basic components of the media item.

When generating, assembling, and/or inserting the media item, the system 106 can use or apply specific rules or preferences. For example, the system 106 can use rules for ordering the components when generating the media item, or preferences for determining when to insert a newly-generated media item into the media stream.

Example Devices

Figure 5A:
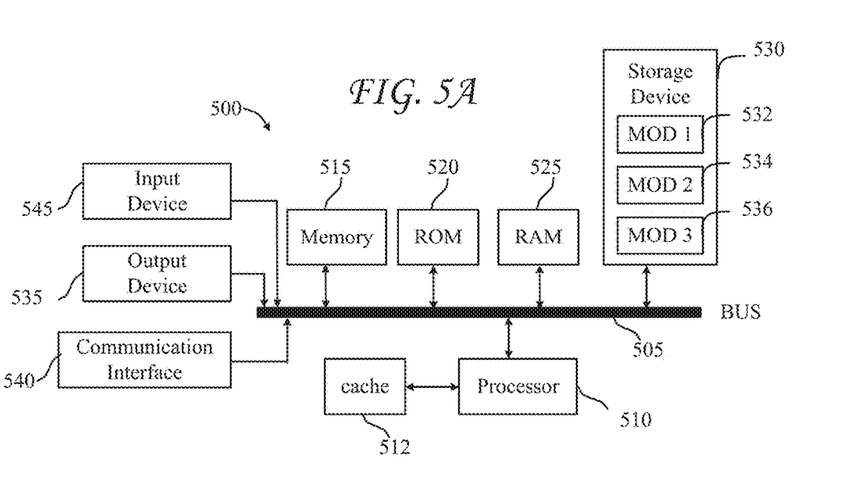
FIGS. 5A and 5B illustrate exemplary system embodiments.
Figure 5B:
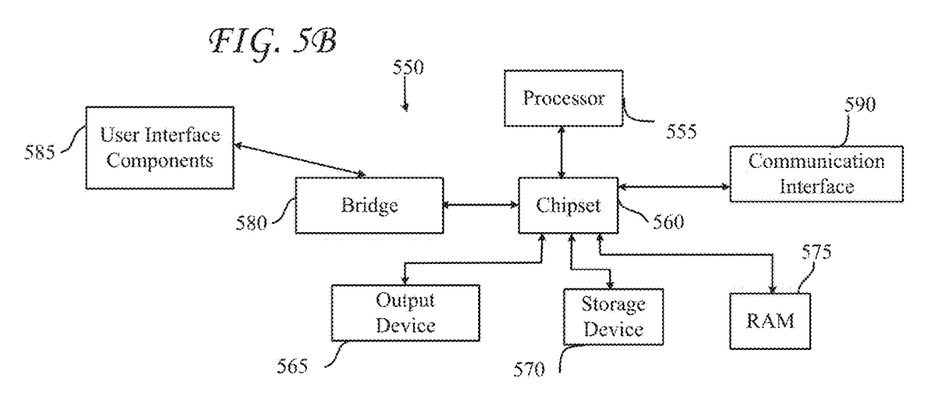

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A computer-implemented method comprising:
    broadcasting a media stream over a network to a user terminal;
    generating, via a processor, a media item to be inserted into the media stream, the media item comprising a first plurality of segments associated with a plurality of discrete components, wherein the first plurality of segments has a first length in time and includes a first number of the plurality of discrete components and a first set of discrete component types;
    inserting the media item into the media stream being broadcasted;
    in response to a triggering event, re-generating, via the processor, the media item by assembling a second plurality of segments using a different plurality of the discrete components, wherein the second plurality of segments has a second length in time and includes a second number of the plurality of discrete components and a second set of discrete component types, wherein the triggering event is at least in part based on one of a predetermined number of presentations, a predetermined number of intervals, a predetermined number of events, or a period of time; and
    inserting the re-generated media item into the media stream being broadcasted over the network.

2. The method of claim 1, wherein at least one of the first or the second plurality of segments comprises a variable segment, and wherein assembling the second plurality of segments comprises:
    selecting discrete components for the second plurality of segments, wherein a component from the selected discrete components which is associated with the variable segment in the re-generated media item is different than a previous component associated with the variable segment in the media stream; and
    assembling the selected discrete components.

3. The method of claim 1, wherein assembling the first or the second plurality of segments comprises:
    selecting a vocal track component from a plurality of vocal track component for a first segment from the first or the second plurality of segments;
    selecting a background music component from a plurality of music components for a second segment from the first or the second plurality of segments;
    selecting a visual media asset from a plurality of media assets for a third segment from the first or the second plurality of segments;
    selecting a bumper content item from a plurality of bumper content items for a fourth segment from the first or the second plurality of segments; and
    assembling the first segment, the second segment, the third segment, and the fourth segment using the vocal track component, the background music component, the visual media asset, and the bumper content item.

4. The method of claim 3, wherein assembling further comprises replacing at least one component associated with the first segment, the second segment, the third segment, or the fourth segment with a different component.

5. The method of claim 4, wherein the different component is of a same type, wherein the visual media asset comprises a banner asset, and wherein the bumper content is provided at a beginning or an end of the media stream.

6. The method of claim 1, wherein the media stream comprises a radio stream.

7. A system comprising:
    a processor; and
    a computer-readable storage medium having stored therein instructions which, when executed by the processor, cause the processor to perform operations comprising:
        broadcasting a media stream over a network to a user terminal;
        generating a media item to be inserted into the media stream, the media item comprising a first plurality of segments associated with a plurality of discrete components, wherein the first plurality of segments has a first length in time and includes a first number of the plurality of discrete components and a first set of discrete component types;
        inserting the media item into the media stream being broadcasted;

in response to a triggering event, re-generating, via the processor, the media item by assembling a second plurality of segments using a different plurality of the discrete components, wherein the second plurality of segments has a second length in time and includes a second number of the plurality of discrete components and a second set of discrete component types, wherein the triggering event is at least in part based on one of a predetermined number of presentations, a predetermined number of intervals, a predetermined number of events, or a period of time; and inserting the re-generated media item into the media stream being broadcasted over the network.

8. The system of claim 7, wherein at least one of the first or the second plurality of segments comprises a variable segment, and wherein assembling the second plurality of segments comprises:
  selecting discrete components for the second plurality of segments, wherein a component from the selected discrete components which is associated with the variable segment in the re-generated media item is different than a previous component associated with the variable segment in the media stream; and
  assembling the selected discrete components.

9. The system of claim 7, wherein assembling the first or the second plurality of segments comprises:
  selecting a vocal track component from a plurality of vocal track component for a first segment from the first or the second plurality of segments;
  selecting a background music component from a plurality of music components for a second segment from the first or the second plurality of segments;
  selecting a visual media asset from a plurality of media assets for a third segment from the first or the second plurality of segments;
  selecting a bumper content item from a plurality of bumper content items for a fourth segment from the first or the second plurality of segments; and
  assembling the first segment, the second segment, the third segment, and the fourth segment using the vocal track component, the background music component, the visual media asset, and the bumper content item.

10. The system of claim 9, wherein assembling further comprises replacing at least one component associated with the first segment, the second segment, the third segment, or the fourth segment with a different component.

11. The system of claim 10, wherein the different component is of a same type, wherein the visual media asset comprises a banner asset, and wherein the bumper content is provided at a beginning or an end of the media stream.

12. The system of claim 7, wherein the media stream comprises a radio stream.

13. A non-transitory computer-readable storage medium having stored therein instructions which, when executed by a processor, cause the processor to perform operations comprising:
  broadcasting a media stream over a network to a user terminal;
  generating, via a processor, a media item to be inserted into the media stream, the media item comprising a first plurality of segments associated with a plurality of discrete components, wherein the first plurality of segments has a first length in time and includes a first number of the plurality of discrete components and a first set of discrete component types;
  inserting the media item into the media stream being broadcasted;
  in response to a triggering event, re-generating, via the processor, the media item by assembling a second plurality of segments using a different plurality of the discrete components, wherein the second plurality of segments has a second length in time and includes a second number of the plurality of discrete components and a second set of discrete component types, wherein the triggering event is at least in part based on one of a predetermined number of presentations, a predetermined number of intervals, a predetermined number of events, or a period of time; and
  inserting the re-generated media item into the media stream being broadcasted over the network.

14. The non-transitory computer-readable storage medium of claim 13, wherein at least one of the first or the second plurality of segments comprises a variable segment, and wherein assembling the second plurality of segments comprises:
  selecting discrete components for the second plurality of segments, wherein a component from the selected discrete components which is associated with the variable segment in the re-generated media item is different than a previous component associated with the variable segment in the media stream; and
  assembling the selected discrete components.

15. The non-transitory computer-readable storage medium of claim 13, wherein assembling the first or the second plurality of segments comprises:
  selecting a vocal track component from a plurality of vocal track component for a first segment from the first or the second plurality of segments;
  selecting a background music component from a plurality of music components for a second segment from the first or the second plurality of segments;
  selecting a visual media asset from a plurality of media assets for a third segment from the first or the second plurality of segments;
  selecting a bumper content item from a plurality of bumper content items for a fourth segment from the first or the second plurality of segments; and
  assembling the first segment, the second segment, the third segment, and the fourth segment using the vocal track component, the background music component, the visual media asset, and the bumper content item.

16. The non-transitory computer-readable storage medium of claim 15, wherein assembling further comprises replacing at least one component associated with the first segment, the second segment, the third segment, or the fourth segment with a different component.

17. The non-transitory computer-readable storage medium of claim 16, wherein the different component is of a same type, wherein the visual media asset comprises a banner asset, and wherein the bumper content is provided at a beginning or an end of the media stream.

18. A computer-implemented method comprising:
  generating, via a processor, a media item to be inserted into a media stream broadcasted over a network by a server, the media item comprising a first plurality of segments associated with a plurality of discrete components, wherein the first plurality of segments has a first length in time and includes a first number of the plurality of discrete components and a first set of discrete component types;
  sending the media item to the server for insertion into the media stream being broadcasted;
  in response to a triggering event, re-generating, via the processor, the media item by assembling a second plurality of segments using a different plurality of the discrete components, wherein the second plurality of segments has a second length in time and includes a second number of the plurality of discrete components and a second set of discrete component types wherein the triggering event is at least in part based on one of a predetermined number of presentations, a predetermined number of intervals, a predetermined number of events, or a period of time; and sending the re-generated media item to the server for insertion into the media stream being broadcasted over the network.

19. The computer-implemented method of claim 18, wherein assembling the first or the second plurality of segments comprises:

selecting a vocal track component from a plurality of vocal track component for a first segment from the first or the second plurality of segments;

selecting a background music component from a plurality of music components for a second segment from the first or the second plurality of segments;

selecting a visual media asset from a plurality of media assets for a third segment from the first or the second plurality of segments;

selecting a bumper content item from a plurality of bumper content items for a fourth segment from the first or the second plurality of segments; and assembling the first segment, the second segment, the third segment, and the fourth segment using the vocal track component, the background music component, the visual media asset, and the bumper content item.

20. The computer-implemented method of claim 19, wherein assembling further comprises replacing at least one component associated with the first segment, the second segment, the third segment, or the fourth segment with a different component.

21. The computer-implemented method of claim 20, wherein the different component is of a same type, wherein the visual media asset comprises a banner asset, and wherein the bumper content is provided at a beginning or an end of the media stream.

* * * * *